United States Patent
Helfet

(10) Patent No.: US 7,425,274 B1
(45) Date of Patent: Sep. 16, 2008

(54) AQUARIUM FILTER UNIT

(76) Inventor: Leon Helfet, 1539 San Rafael Way, Camarillo, CA (US) 93012

(*) Notice: Subject to any disclaimer, the term of this patent is extended or adjusted under 35 U.S.C. 154(b) by 219 days.

(21) Appl. No.: 11/273,822

(22) Filed: Nov. 14, 2005

Related U.S. Application Data

(60) Provisional application No. 60/635,422, filed on Dec. 9, 2004.

(51) Int. Cl.
A01K 63/04 (2006.01)
C02F 3/08 (2006.01)

(52) U.S. Cl. .............. 210/807; 210/151; 210/167.25; 210/167.27; 210/232; 210/282; 210/416.2

(58) Field of Classification Search .......... 210/150, 210/151, 167.22, 167.25, 167.27, 232, 282, 210/416.1, 485, 416.2, 807; 119/260
See application file for complete search history.

(56) References Cited

U.S. PATENT DOCUMENTS

| | | | |
|---|---|---|---|
| 2,087,442 A * | 7/1937 | Nack ........................ 210/275 |
| 2,100,951 A * | 11/1937 | Glass et al. ................. 210/461 |
| 2,605,901 A | 8/1952 | Morrison et al. |
| 3,300,047 A * | 1/1967 | Hirsch ........................ 210/197 |
| 3,513,978 A | 5/1970 | Newsteder |
| 3,723,304 A * | 3/1973 | Storck ........................ 210/602 |
| 4,483,769 A | 11/1984 | Sherman |
| 4,512,885 A | 4/1985 | Willinger |
| 4,713,173 A | 12/1987 | Goldman et al. |
| 4,906,381 A * | 3/1990 | Barbaro ...................... 210/660 |
| 5,002,660 A | 3/1991 | Sherman et al. |
| 5,248,415 A * | 9/1993 | Masuda et al. .............. 210/154 |
| 5,290,436 A | 3/1994 | Danner |
| 5,322,622 A * | 6/1994 | Chiang ................... 210/167.25 |
| 5,423,978 A | 6/1995 | Snyder et al. |
| 5,618,419 A | 4/1997 | Fuerst et al. |
| 5,632,887 A | 5/1997 | Gargas et al. |
| 6,210,567 B1 * | 4/2001 | Takada ................... 210/167.22 |
| 6,843,909 B1 * | 1/2005 | Woltmann ................... 210/151 |
| 7,087,158 B2 * | 8/2006 | Miyamoto et al. .......... 210/151 |
| 7,208,084 B2 * | 4/2007 | Axelrod ................. 210/167.21 |

FOREIGN PATENT DOCUMENTS

JP P2003-200183 A * 7/2003

* cited by examiner

*Primary Examiner*—Fred Prince
(74) *Attorney, Agent, or Firm*—Jack Munro; Sandy Lipkin

(57) ABSTRACT

An aquarium filter which is constructed of a housing which includes a module. The module is divided into a plurality of different sections. A separate filter cartridge is to be mounted within each section. Each filter cartridge is to be removable and replaceable in conjunction with its specific section.

4 Claims, 3 Drawing Sheets

AQUARIUM FILTER UNIT

This application is claiming as priority provisional application Ser. No. 60/635,422 filed Dec. 9, 2004, entitled FILTER CARTRIDGE WITH INTERCHANGEABLE MODULE COMPONENTS by the present inventor.

BACKGROUND OF THE INVENTION

1. Field of the Invention

The present invention relates to aquariums and more particularly to an aquarium filter unit that includes different types of filter cartridges with each cartridge being replaceable.

2. Description of the Related Art

Aquarium filters utilizing filtering cartridges have long been known. At the present time, what is being manufactured and sold principally is an enclosed composite cartridge. Within that enclosed cartridge is located mechanical filtration, chemical filtration and sometimes biological filtration. The mechanical and chemical filtering cartridges are presently combined forming a composite cartridge. Almost invariably, the first stage of filtering that becomes ineffective is the mechanical filter. The mechanical filter is to filter out solid matter from the aquarium water. Typical solid matter would be feces and food particles. Once the mechanical filter becomes ineffective, the entire filter composite cartridge is to be discarded. The chemical filter and the biological filter within the cartridge in all likelihood will not require replacement. Even so, the cartridge is completely discarded. Within the United States alone, there are literally millions of aquariums. Millions of these composite plastic aquarium cartridges are being discarded and deposited in landfills which is really not necessary if only just the mechanical filter could be replaced. Also, aerobic bacterial cultivation takes place on the exterior surface of the activated carbon granules of the chemical filter and on the biological filter, and throwing out of the entire unit disrupts this cultivation. Not only is it wasteful for the aquarium hobbyist to dispose of filter cartridges that are not totally consumed, but it is also costly.

SUMMARY OF THE INVENTION

The first basic embodiment of the present invention is directed to an aquarium filter unit comprising a module frame removably mounted within a housing having a water inlet and a water outlet. A mechanical filter cartridge is removably mounted within the module frame. A chemical filter cartridge is removably mounted within the module frame. A biological filter cartridge can be removably mounted within the module frame.

A further embodiment of the present invention is where the first basic embodiment is modified by defining that the mechanical filter cartridge comprises a fibrous medium mounted within an enclosing frame.

A further embodiment of the present invention is where the first basic embodiment is modified by defining that the chemical filter cartridge includes at least one unit which contains a plurality of spaced apart compartments each of which contains a quantity of activated carbon granules.

A further embodiment of the present invention is where the just previous embodiment is modified by defining that each compartment of the compartments have an inlet opening arrangement and outlet opening arrangement. The inlet opening arrangement is located at the bottom of each of the compartments and the outlet opening arrangement is located at the top of each of the compartments.

A further embodiment of the present invention is where the just previous embodiment is modified by defining that the unit includes a handle and the unit is to be installable by grabbing the handle and slipping the unit into the module frame with the compartments arranged in a vertically spaced orientation.

A further embodiment of the present invention is where a previous embodiment is modified by defining that the granules do not completely fill each compartment.

A further embodiment of the present invention is where the first basic embodiment is modified by defining that there is mounted a weir on the housing with the weir being associated with the water outlet and the water that is being discharged from the housing is to pass over the weir.

A second basic embodiment of the present invention is directed to an aquarium filter which has a housing which has an internal chamber. Water is to be supplied into the internal chamber and a water outlet is connected to the internal chamber. A module frame is removably mounted within the internal chamber. The module frame has a first section and a second section. A mechanical filter cartridge is removably mounted within the first section and a chemical filter cartridge is removably mounted within the second section.

A further embodiment of the present invention is where the second basic embodiment is modified by defining that the housing includes a weir and the weir is associated with the water outlet and the water that is being discharged from the housing is to be conducted over the weir.

A further embodiment of the present invention is where the second basic embodiment is modified by defining that the mechanical filter cartridge includes a fibrous medium which is mounted within an enclosing frame.

A further embodiment of the present invention is where the second basic embodiment is modified by defining that the chemical filter cartridge includes at least one compartment which contains a quantity of activated carbon granules.

A further embodiment of the present invention is where the just previous basic embodiment is modified by defining that each compartment has an inlet opening arrangement and an outlet opening arrangement. The inlet opening arrangement is located at the bottom of the compartment. The outlet opening arrangement is located at the top of the compartment.

A further embodiment of the present invention is where the just previous embodiment is modified by defining that the unit includes a handle. The unit is to be installable by grabbing of the handle and slipping the unit within the module frame with the compartments arranged in a vertically spaced orientation.

A further embodiment of the present invention is where a previous basic embodiment is modified by defining that the granules contained within each of the compartments do not completely fill the compartment.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figures 1, 4, 5:
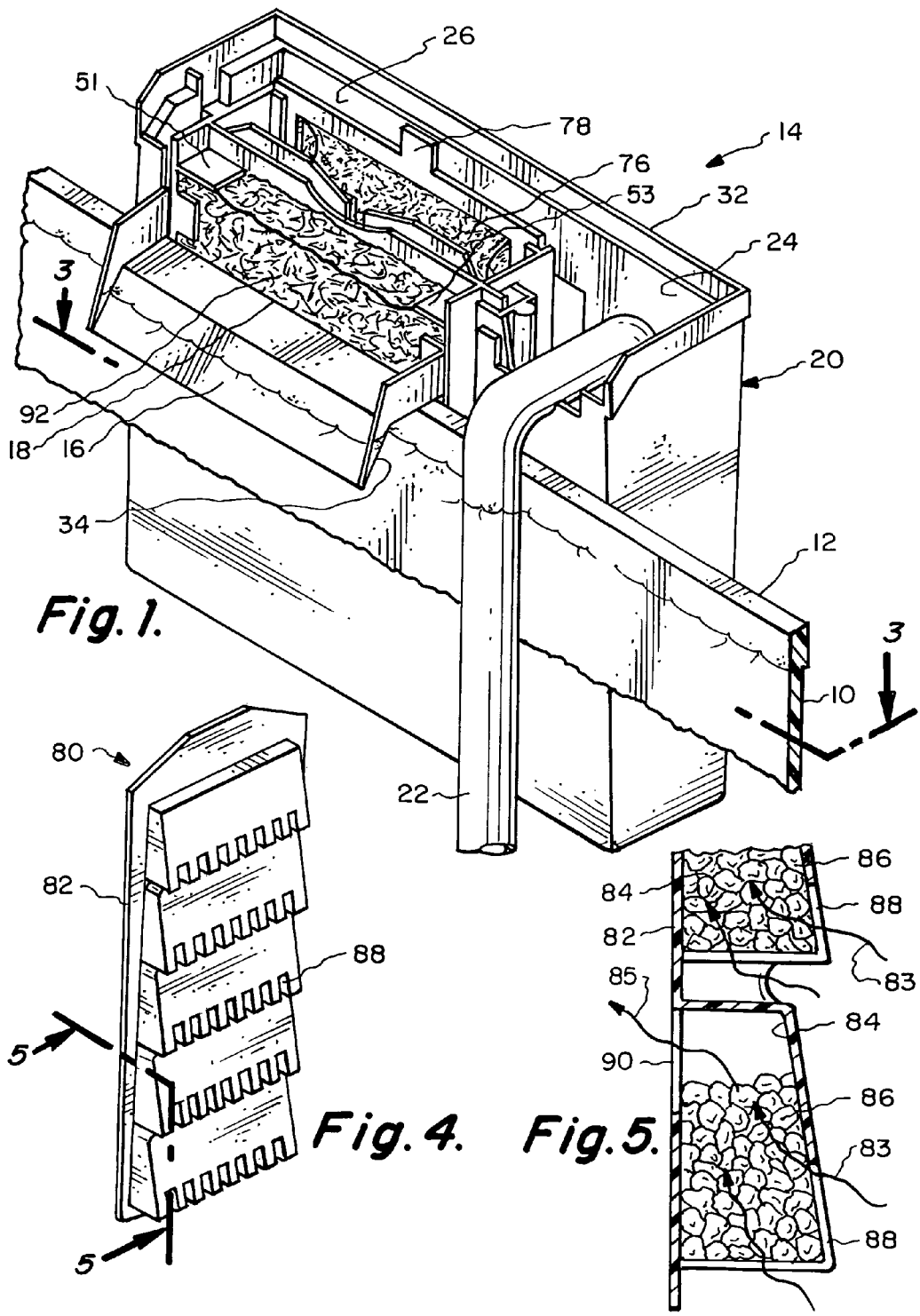
FIG. 1 is an exterior isometric view of the aquarium filter of the present invention showing such installed in conjunction with a wall of an aquarium.
FIG. 4 is an isometric view of a unit of the chemical filter cartridge that is usable in conjunction with the aquarium filter of the present invention.
FIG. 5 is a cross-sectional view through the chemical filter cartridge taken along line 5-5 of FIG. 4.

Referring particularly to FIG. 1, there is depicted part of an aquarium wall 10 which has an edge 12. The aquarium filter 14 of this invention is to be mounted in conjunction with the aquarium wall 10. The aquarium filter 14 has a weir member 16 which is basically channel shaped. Water from the outlet opening 18 is to be conducted over the weir member 16. The weir member 16 is fixedly mounted onto housing 20 of the aquarium filter 14 of this invention. The housing 20 is basically a box with an open top. Water from the aquarium is to be supplied by a pump, which is not shown, through conduit 22. The water from the conduit 22 is supplied into an inlet chamber 24. The inlet chamber 24 is partially divided from the remainder portion of the internal chamber 26 of the housing 20 by a divider wall 28. The divider wall 28 is mounted on the bottom wall 30 of the housing 20 and extends up to almost adjacent the free upper edge 32 of the housing 20.

Figure 2:
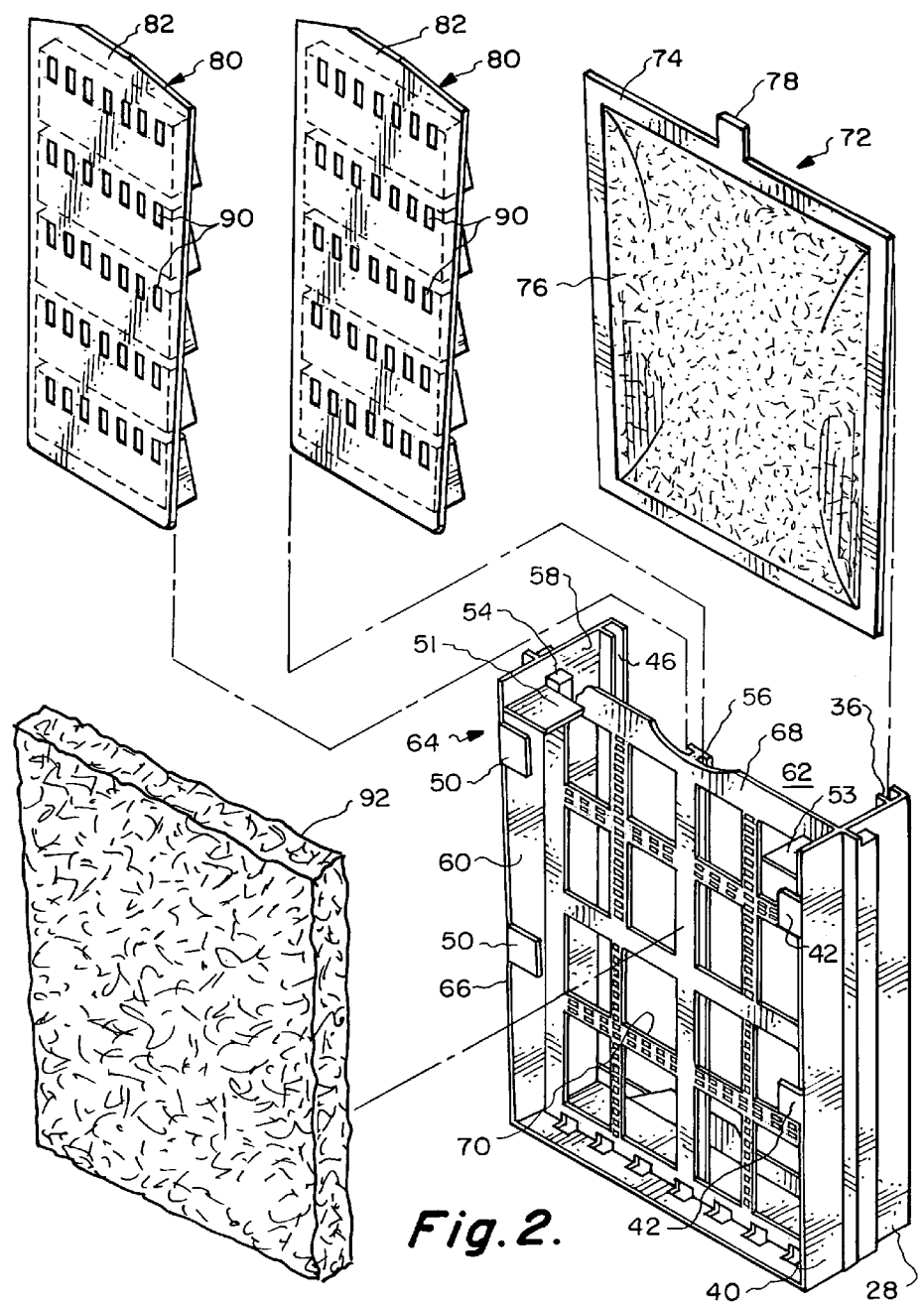
FIG. 2 is an exploded isometric view of the module which contains the different types of filter cartridges that are to be usable in conjunction with the filter of FIG. 1.
Figure 3:
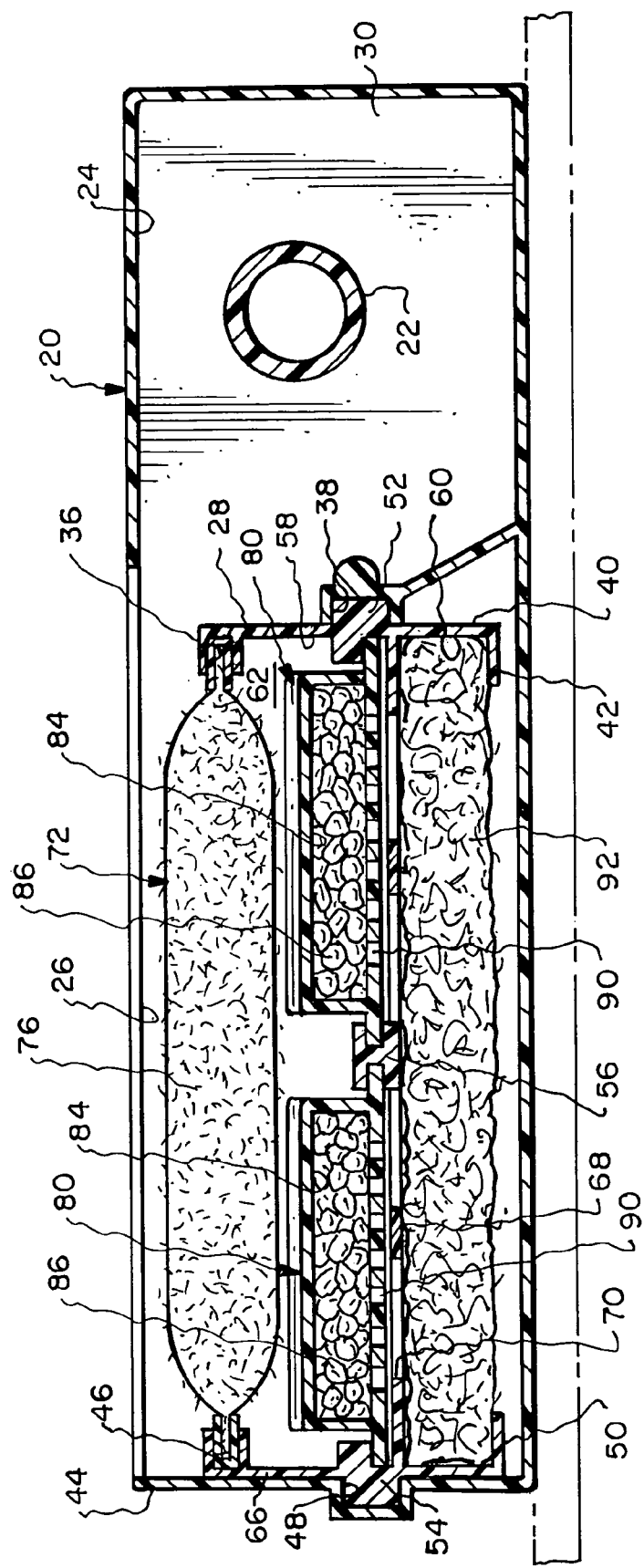
FIG. 3 is a cross-sectional view taken through the aquarium filter of the present invention taken through line 3-3 of FIG. 1.

The weir 16 has a longitudinal channel 34. The aquarium wall 10 is to be located within the channel 34 with the edge 12 abutting directly against the undersurface of the weir 16. This will support the housing 20 on the aquarium wall 10. The divider wall 28 includes a pair of spaced apart vertical grooves 36 and 38. The divider wall 28 also includes an extension 40 which has an inwardly extending exterior flange 42. The sidewall 44 of the housing 20 includes a vertical groove 46 and a separate vertical groove 48. Sidewall 44 includes an inwardly extending flange 50. Within the vertical groove 38 is mounted a plug 52. Plugs 52 and 54 are in alignment along with vertical brace 56. The general area between the plugs 52 and 54 constitutes a compartment 58. The area between compartment 58 and flanges 42 and 50 is defined as another compartment 60. The general area between the grooves 36 and 46 defines a third compartment 62. These compartments 56, 58 and 60 are contained within a module 64. The module 64 includes the divider wall 28 and the divider wall extension 40 and on the opposite side of the generally rectangularly shaped box-like module 64. The module 64 includes a barrier wall 68 that essentially divides compartments 58 and 60. This barrier wall 68 includes a mass of large openings 70 with sixteen in number of the openings 70 being shown in FIG. 2. However, it is to be understood that the number and size of the openings can be increased or decreased without departing from the scope of this invention. The water that is supplied within the internal chamber 24 is to pass into compartment 62 then into compartment 58 and then through compartment 60 to be deposited onto the weir 16 which will then flow back into the aquarium.

Within the compartment 62 there is to be located a mechanical filter cartridge 72. The mechanical filter cartridge 72 is to be constructed to be basically rectangular in configuration having a solid peripheral frame 74 which encloses a fibrous mass 76. The fibrous mass 76 can take the form of any natural or plastic fibrous material which is commonly used in air filters, oil filters and water filters. Fixedly attached to the frame 74 is a protuberance which forms a handle 78. The user by using of handle 78 avoids contact with the fibrous mass 76 which can be contaminated when the mechanical filter cartridge 72 is removed from the compartment 62. The fibrous mass 76 is to be porous and spongy. The mechanical filter cartridge 72 is to be manufactured by placing the fibrous mass 76 within an injection molding machine and then molten plastic is then inserted to function to form the frame 74 and the handle 78. However, the frame 74 could be made of two separate parts that snap together so that the mechanical filter cartridge 72 can be made in another manner other than within an injection molding machine. The mechanical filter cartridge 72 is intended to remove algae, fish excrement, excess fish food, dirt and debris. The frame 74 of the mechanical filter cartridge 72 is to be slid within the grooves 36 and 46 which thereby will retain the position of the mechanical filter cartridge 72 within the compartment 62.

The chemical filter cartridge 80 comprises a plastic molding forming a housing 82. The chemical filter cartridge 80 within the present invention comprises two identical units with one unit being located between the vertical brace 86 and plug 52 and the other unit being located between the vertical brace 56 and the plug 48. Housing 82 is divided into a plurality of compartments 84 with five in number being shown for each housing 82. Each compartment 84 comprises a small chamber within which is to be located a quantity of activated carbon granules 86. It is important that the carbon granules 86 do not completely fill the compartment 84. The housing of each compartment 84 includes a series of inlet slots 88 and an series of outlet slots 90. It is to be noted that within each compartment 84 the inlet slots 88 are the lower level than the outlet slots 90. The water must enter through slots 88 as indicated by arrow 83, pass through the granules and then out through the outlet slots 90 as indicated by arrow 85. This means that the water must interweave its way through all of the granules 86. In prior art chemical filters, the activated carbon would just be placed within a chamber that is located between a front wall includes a mass of inlet holes and a back wall that includes a mass of outlet holes. The activated carbon did not fill the chamber, so the result is the water, which has a tendency to take the path of least resistance, will flow primarily through the filter without passing into contact with the activated carbon granules. Utilizing of the chemical filter cartridge 80 of this invention, all of the water must come in direct contact with the granules as it is passed through each compartment 84.

It is important that the granules 86 have a tendency to dance around or move as the water passes therethrough. This will insure that maximum filtration of the water occurs. When water flows through the chemical filter and misses the granules, which occurs in prior art filters, this is known as the "tea bag affect". The movement of the granules as the water passes therethrough is required in order to prevent slime buildup which will stop the flow of the water if the granules 86 are packed too tight. The slime buildup occurs on static surfaces, not moving surfaces, and that is why it is important that the granules 86 constantly move. The chemical filter cartridge 80 is designed to extract from the water chloramine, odors, discoloration and other chemicals, such as arsenic. Also, aerobic bacteria can grow on the surface of the granules 86 which is desirable and necessary for achieving clear and clean water within the aquarium.

It is to be understood that the chemical filter cartridge 80 could comprise a single unit rather than the two separate units. However, the utilizing of two separate units is desirable in that one chemical filter cartridge 80 could be replaced by leaving the other chemical filter cartridge 80 in position for it to be replaced at a later time. The aerobic bacteria that is desirable that has accumulated on the remaining chemical filter cartridge 80 can still be utilized to help clean the aquarium water and which will give time for the bacteria to regrow on the newly replaced chemical filter cartridge 80 before the older chemical filter 80 is replaced.

Another advantage of utilizing of the chemical filter cartridges 80 of this invention is that at times it is necessary to apply a medication into the aquarium. A typical medication would be an antibiotic. In such an instance, the chemical filter cartridge 80 can be removed and the filtering system operated without any chemical filtration which would function to remove the medication from the aquarium water. Once the medication has been applied for a sufficient period of time, the cartridges 80 can then be reinstalled in position within the compartment 58.

Within compartment 60 there is to be added a biological media 92 which generally will take the form of a block of fibrous or porous material. The block is to be retained in the compartment 60 by upper flanges 51 and 53 and flanges 42 and 150. Flanges 42, 50, 51 and 53 are integral with module 64. This fibrous or porous material can comprise a natural wood-type ingredient or could comprise a plastic or ceramic. Aerobic bacteria is intended to be grown on the media 92 with it being retained within the compartment 60. Most often, it is probably never necessary to replace the media 92 as its function is to continuously cultivate aerobic bacteria. Usually, the mechanical filter cartridge 72 is the filter that clogs most frequently and does require replacement. The chemical filter cartridge 80 requires replacement only infrequently. By using the module 64 of this invention, the mechanical filter cartridge 72 can be replaced when needed leaving in place the chemical filter cartridge 80 to be replaced at a later time. The media 92 could be replaced at a future time, but more than likely it would probably never need replacing.

It is to be understood that by the construction of the module 64 and the housing 20 that the water must be conducted from within the internal chamber 24 out through the mechanical filter cartridge 72, then through the chemical filter cartridge 80, then through the media 92 prior to be deposited back into the aquarium. This should achieve maximum filtration of the aquarium water. The fact that the mechanical filter cartridge 72 is only being replaced when it gets clogged thereby avoiding the dumping of a fully functional chemical filter cartridge 80 and fully functional media 92, that a minimal amount of plastic is being discarded by replacing only the mechanical filter cartridge 72.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A method for the filtration of, an aquarium said aquarium comprising an enclosure and housing fish said method comprising removably mounting a filtration unit to said enclosure surrounding said aquarium, said filtration unit further comprising
a module frame removably mounted within a housing, said housing defining an internal chamber and having a water inlet and a water outlet;
a mechanical filter cartridge removably mounted within said module frame;
a chemical filter cartridge removably mounted within said module frame wherein said chemical filter cartridge includes at least one unit which contains a plurality of spaced apart compartments, each of which contains a quantity of activated carbon granules and wherein said granules do not completely fill each of said plurality of spaced apart compartments and wherein each compartment of said plurality of spaced apart compartments has an inlet opening arrangement and an outlet opening arrangement, said inlet opening arrangement being located at the bottom of said compartment, said outlet opening arrangement being located at the top of said compartment;
a pump for bringing water up through said water inlet from said aquarium to be filtered through said module; and
a weir extending from said housing and providing a channel through which said water returns from said water outlet to said aquarium;
activating said pump so that water from said aquarium passes through said water inlet into said internal chamber and through said module over said weir and back into said aquarium;
discarding said mechanical filter cartridge when said mechanical filter cartridge becomes clogged, thereby preserving said chemical filter cartridge until said chemical filter cartridge becomes clogged;
replacing said mechanical filter cartridge;
discarding said chemical filter cartridge when said chemical filter cartridge becomes clogged; and
replacing said chemical filter cartridge.

2. The method as defined in claim 1 wherein said mechanical filter cartridge includes a fibrous medium mounted within an enclosing frame.

3. A method for the filtration of an aquarium, said aquarium comprising an enclosure and housing fish said comprising removably mounting a filtration unit to said enclosure surrounding said aquarium, said filtration unit further comprising
a housing, said housing defining an internal chamber and having a water inlet and a water outlet;
a mechanical filter cartridge removably mounted within said housing;
a chemical filter cartridge removably mounted within said housing wherein said chemical filter cartridge includes at least one unit which contains a plurality of spaced apart compartments, each of which contains a quantity of activated carbon granules and wherein said granules do not completely fill each of said plurality of spaced apart compartments and wherein each compartment of said plurality of spaced apart compartments has an inlet opening arrangement and an outlet opening arrangement, said inlet opening arrangement being located at the bottom of said compartment, said outlet opening arrangement being located at the top of said compartment;

a pump for bringing water up through said water inlet from said body of water to be filtered through said module; and a weir extending from said housing and providing a channel through which said water returns from said water outlet to said aquarium;

activating said pump so that water from said aquarium passes through said water inlet into said internal chamber and over said weir and back into said aquarium;

discarding said mechanical filter cartridge when said mechanical filter cartridge becomes clogged, thereby preserving said chemical filter cartridge until said chemical filter cartridge becomes clogged;

replacing said mechanical filter cartridge;

discarding said chemical filter cartridge when said chemical filter cartridge becomes clogged; and replacing said chemical filter cartridge.

4. The method as defined in claim 3 wherein said mechanical filter cartridge includes a fibrous medium mounted within an enclosing frame.

* * * * *